(12) United States Patent
White

(10) Patent No.: US 8,019,735 B2
(45) Date of Patent: Sep. 13, 2011

(54) SYSTEMS AND METHODS FOR QUERY CACHING

(75) Inventor: Seth White, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 555 days.

(21) Appl. No.: 10/965,528

(22) Filed: Oct. 14, 2004

(65) Prior Publication Data
US 2005/0262059 A1 Nov. 24, 2005

Related U.S. Application Data

(60) Provisional application No. 60/573,402, filed on May 21, 2004.

(51) Int. Cl.
G60F 17/00 (2006.01)
(52) U.S. Cl. .................................. 707/690; 717/116
(58) Field of Classification Search ...... 707/3; 709/200; 717/118, 127
See application file for complete search history.

(56) References Cited

U.S. PATENT DOCUMENTS

| 5,897,634 | A * | 4/1999 | Attaluri et al. .................. 707/8 |
| 6,009,271 | A * | 12/1999 | Whatley .......................... 717/127 |
| 6,185,598 | B1 * | 2/2001 | Farber et al. .................... 709/200 |
| 6,275,819 | B1 * | 8/2001 | Carter ........................ 707/999.002 |
| 6,298,478 | B1 * | 10/2001 | Nally et al. ..................... 717/170 |
| 7,003,587 | B1 * | 2/2006 | Battat et al. ............ 707/E17.005 |
| 2002/0188591 | A1 * | 12/2002 | Santosuosso ..................... 707/1 |
| 2003/0051102 | A1 * | 3/2003 | Jacobs et al. ................... 711/145 |
| 2003/0149689 | A1 * | 8/2003 | Chow et al. ........................ 707/3 |
| 2004/0059719 | A1 * | 3/2004 | Gupta et al. ........................ 707/3 |
| 2004/0236726 | A1 * | 11/2004 | Ewing et al. ........................ 707/3 |
| 2005/0114835 | A1 * | 5/2005 | Francis et al. .................. 717/118 |

OTHER PUBLICATIONS

Kung et al., "On Optimistic Methods for Concurrency Control", ACM Transactions on Database Systems, vol. 6, No. 2, Jun. 1981, pp. 213-226.*

* cited by examiner

*Primary Examiner* — Tim T Vo
*Assistant Examiner* — Thomas Meng
(74) *Attorney, Agent, or Firm* — Fliesler Meyer LLP

(57) ABSTRACT

A query caching system and method for enabling the caching of software object instances at the granularity of query level. A query component in a container can issue a query to retrieve a query result from a database within a scope of a transaction. The query result includes one or more instances of a class that represents one or more persisted data entries retrieved from the database. A cache management component retrieves the query result for the query in the cache when a query registration component finds out that another query matches the query in the query registry. If the class is expected to remain unchanged within the transaction, the class can be configured to be used concurrently by multiple users, using an optimistic concurrency strategy. The cached query result can be invalidated during the transaction, when any row in any table in the database associated with the cached query result, or a range of any data entry of the one or more persisted data entries in the query is updated or invalidated.

31 Claims, 4 Drawing Sheets

```
Context ctx = new InitialContext();

QueryLocalHome qlh =
  (QueryLocalHome)ctx.lookup("java:comp/ejb/CustomerHome");

CustomerHome custHome = (CustomerHome)qlh.getCachingHome();

custHome.findByName("Jones");

custHome.findByName("Smith");
```

Figure 3

```
Context ctx = new InitialContext();

QueryLocalHome qlh =
    (QueryLocalHome)ctx.lookup("java:comp/ejb/CustomerHome");

Query query = qlh.createQuery();

query.setQueryCaching(true);

query.find("select OBJECT(c) from CustomerEJB c where c.name='Jones');

query.find("select OBJECT(c) from CustomerEJB c where c.name='Smith');
```

Figure 4

SYSTEMS AND METHODS FOR QUERY CACHING

CLAIM OF PRIORITY

This application claims priority from the following applications, which are hereby incorporated by reference in their entireties:

U.S. Provisional Patent Application No. 60/573,402, entitled SYSTEM AND METHOD FOR SQL QUERY CACHING by Seth White, filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of caching of query results from database.

BACKGROUND

A server-side application component can be utilized to encapsulate the business logic of an application. Here the server-side application component can be an instance of a programmable class (also referred to as class), which can be but is not limited to, a Java bean, an Enterprise Java Bean (EJB), an interface, a module, and other suitable concepts, and EJB will be used to illustrate the various embodiments of the invention in the following context. The instances of an EJB are created and managed at runtime by a container, which runs as part of an application server to provide enterprise applications with a high level of abstraction. An EJB can be customized at deployment time via a deployment descriptor, which allows the editing of both the structural and application assembly information about the EJB. An important type of EJB is the entity bean, which is a component that represents an object-oriented view of some entities stored in a persistent storage, such as a database, or entities that are implemented by an existing enterprise application. An EJB query component, such as an EJB Finder, can be deployed in the container to query a database based on a query and receive as the query result, one or more EJB instances containing matched data entities in a database. Here, the database can be a relational database, an Oracle Database, an MS SQL server, a DB2, and other suitable concepts. The query languages utilized by the query can be, but are not limited to, SQL and EJB-QL, wherein EJB-QL is a standard query language that allows queries to be specified against an EJB object without requiring any knowledge of the underlying types of the databases. The query result can be stored in a cache in the container. Here, the cache can be an in-memory storage component enabling fast and easy access to the query result. Once the result of a query is cached, a round-trip access to the database can be spared if the same query is called again later.

In many current web application architectures, only EJB instances of queries using primary keys of data entities in the database can be cached and accessed later. The result of a non-primary key query is often not retrievable from cache, and such query may have to access the database each time it is called. This limits the performance of the application server since non-primary key queries are quite commonly used.

BRIEF DESCRIPTION OF THE DRAWINGS

FIG. 3 is an exemplary code illustrating the concept of explicit caching in accordance with one embodiment of the present invention.

FIG. 4 is an exemplary code illustrating the concept of dynamic query in accordance with one embodiment of the present invention.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention enable the caching of EJB instances at the granularity of query level. It removes the current limitation on EJB caching by allowing the result of an arbitrary query that uses, e.g., either a primary key or a non-primary key, to be stored in the in-memory cache in the container. The performance of an application server can be improved significantly since the result of an query called after the result of an earlier identical query has been cached can be retrieved from the cache directly without accessing the underlying database again. In addition, such query caching has an advantage in performance since it can be executed implicitly by the container instead of being explicitly invoked in the application code by the user.

Figure 1:
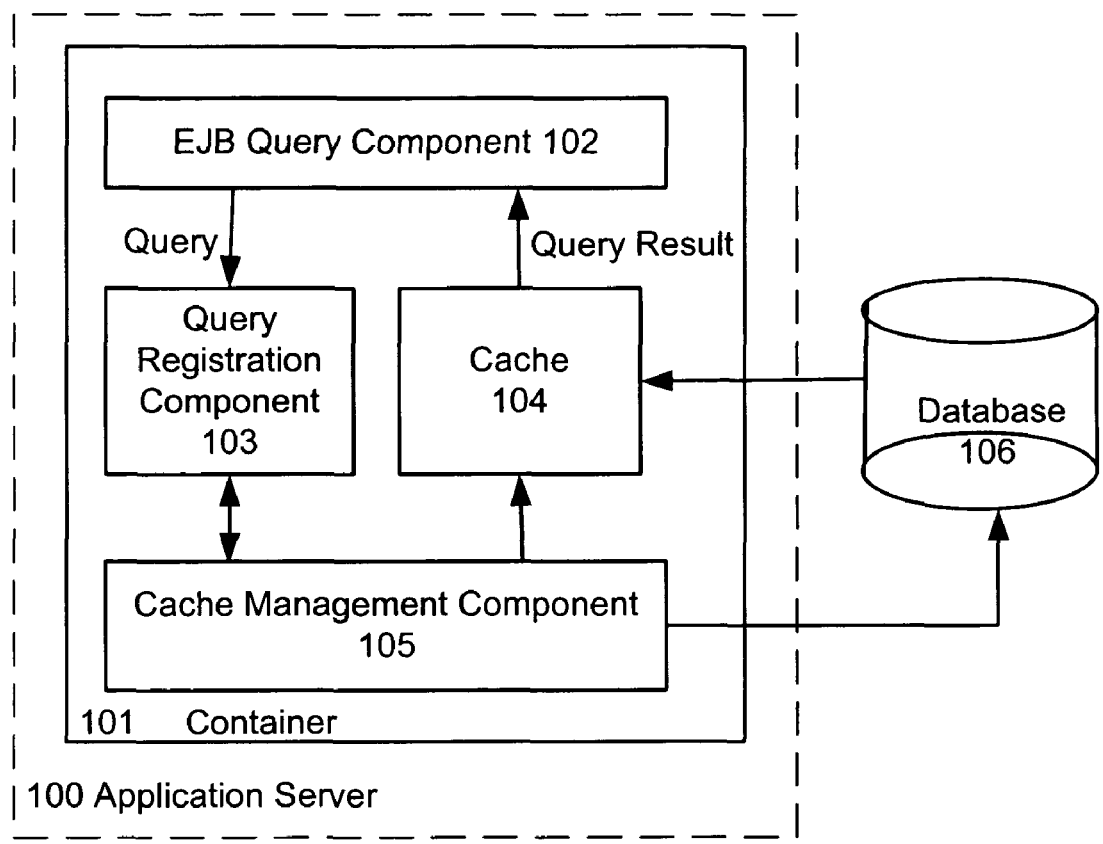
FIG. 1 is an illustration of an exemplary query caching system in accordance with one embodiment of the present invention.

FIG. 1 is an illustration of an query caching system in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an EJB query component 102 deployed inside a container 101 on an application server 100 is capable of issuing an arbitrary query for EJB instance(s), using either primary or non-primary keys. A query registration component 103 maintains in its query registry a list of strings of queries that are currently cached; it can add and/or delete a query string from the registry when necessary. It can also look up the string of the current query in the registry to find out if the same query has been called before and if its result has been cached. A cache management component 104 can retrieve the result of a query from a cache 105 and provide it to the EJB query component. In case a query has not been cached, the cache management component is capable of accessing a database 106 using the current query, retrieving the matched data entities from the database, creating corresponding EJB instance(s) as the query result, and caching it.

In case the cache is full, it can select and remove the results of one or more queries from the cache to leave space for the caching of the result of the current query. The cache management component is also capable of invalidating the result of a cached query if part of the result becomes invalid.

Figure 2:
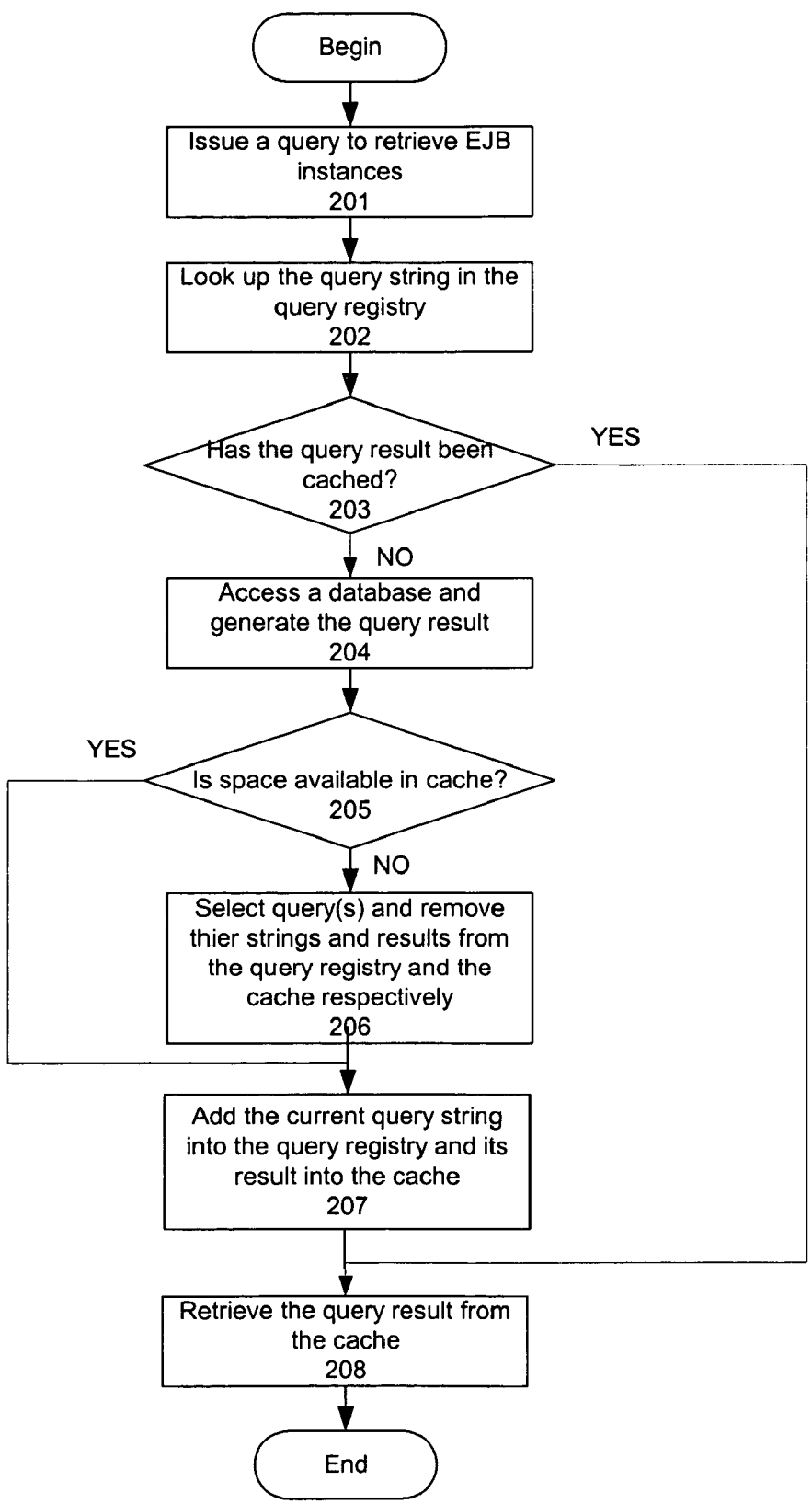
FIG. 2 is a flow chart illustrating an exemplary query caching process in accordance with one embodiment of the present invention.

FIG. 2 is a flow chart illustrating an exemplary query caching process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, an arbitrary query is issued to retrieve EJB instances at step 201. At step 202, the string of the current query is looked up in the query registry to see if it has been cached. If it is determined at step 203 that the current query has been cached, its result is then retrieved from the cache directly at step 208; otherwise, a database access is needed at step 204 to retrieve the matched data entities and generate the result of the current query. Once the query result is generated, step 205 will check if there is still space available in the cache. If so, the string of the current query and its result will be added to the query registry and cache respectively at step 207; otherwise, the strings and results of one or more queries will be removed from the query registry and the cache respectively at step 206 to leave space for the caching of the result of the current query.

In some embodiments, explicit query caching strategy can be adopted by the EJB query component to perform the query caching. Explicit query caching gives the application developer direct control over which query results should be cached. It offers the same level of control that developers have when they explicitly put data in a cache. FIG. 3 shows an exemplary code for explicit query caching. Referring to FIG. 3, an EJB Finder uses a method "getCachingHome" to explicitly set the current query interface "QueryLocalHome" as cacheable so that the results from the subsequent two "findByName" queries will be cached.

In some embodiments, implicit caching strategy can be adopted by the EJB query component to perform query caching. In contrast to the explicit query caching strategy, the implicit caching strategy is enabled in the deployment descriptor of the container on a per EJB finder basis, wherein an "enable-query-caching" element in the descriptor is set to values of true or false. When it is set to true by an EJB Finder, the result of every query by that EJB finder is cached, subject to the space available in the cache. If there is no cache space available, query caching is effectively disabled even when enable-query-caching is 'true'.

In some embodiments, dynamic queries are supported for the query caching. Here, a dynamic query allows a user to define tables, columns, joins, sort orders, and other important data entities and/or operations to a database dynamically at runtime. FIG. 4 shows an exemplary code for dynamic query caching. Referring to FIG. 4, two consecutive queries are executed with two statements having different arguments but using the same query structures and settings.

In some embodiments, the query registration component is capable of performing an exact match between the query strings in its query registry and the string of the current query. Such a matching strategy will declare a match between the string of the current query and a query string in the registry only when the two strings are exactly the same. In situations where the potential data entities retrieved by the two queries overlap with each other but are not entirely identical, e.g., one is a subset of or intersects with the other, the two query strings are not considered a match and the result of the current query can only be generated via an access to the database under such circumstances.

In some embodiments, a limit can be set on the maximum number of queries that can be cached. The cache will be determined as full if the limit has been reached when caching the current query result. Such a limit can also be used to disable the query caching when it is set to zero.

In some embodiments, approaches based on the usage of EJB results in the cache can be used to select the results of one or more queries to be removed from the cache when it is full to leave space for the result of the current query. One of such approaches can be a least-recently-used (LRU) algorithm, which may proceed as follows:

Set a timer for each query result in the cache to count the time it is last retrieved;
Reset the timer of a query result to zero when it is retrieved;
Repeat the following steps while space is needed for the caching of the result of the current query:
Pick a query that is least recently used;
Remove the query string from the query registry and its result from the cache;
Cache the result of the current query, set its timer to zero, and add its string to the query registry.

In some embodiments, an EJB can be an entity bean, which represents persistent data entities retrieved from a database. More specifically, an EJB can be a read-only bean or an optimistic bean, suited for read-only or optimistic concurrency control strategy, respectively. A read-only bean can be used to cache data entities from a database that is frequently accessed but rarely updated. It is best suited for situations where the underlying data entities in its instances never change, or change infrequently. An optimistic bean is an entity bean that is used by a transaction, and it is not locked by the application server during the transaction. It is regarded as "optimistic" due to the fact that no changes are expected to be made to the data entities in its instances while it is being used by that transaction. Under this belief, there is no need to lock an optimistic bean since the data entities in its instances will not change during a transaction, and since it is not locked, its instances can be used concurrently by multiple users.

In some embodiments, a cached query result that contains instances of read-only beans becomes invalid as soon as any bean instance that is a part of the query result is no longer valid. This could be due to a read-timeout expiration, for example. The reasoning behind such invalidation is that since a part of the query result has to be regenerated from the database due to the invalidation, the entire query may as well be re-executed so that the consistency of the result of the query can be maintained. Treating the query result in its entirety will avoid any potential issues caused by partial updating and invalidation of the result. Once the result of a query becomes invalid, its string and its result will be removed from the query registry and the cache, respectively.

In some embodiments, a cached query result that contains instances of optimistic beans becomes invalid when any row in any table in the domain or range of the underlying data entities in the query is updated or invalidated. For example, if a query returns all Customer bean instances with an account balance greater than $1000, then any update or invalidation of the customer or account tables in the database will cause the query result to be invalidated, and its string and its result will be removed from the registry and cache, respectively. If a query result contains both optimistic and read-only beans, the union of both approaches discussed above should be taken.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks, including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, method, class, interface, component, model, and other suitable concepts; While the concept "instance" is used in the embodiments of the systems and methods described above, it will be evident that such concept can be interchangeably used with equivalent concepts such as, object, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide query caching, comprising:
one or more microprocessors;
a query component, running on the one or more microprocessors, wherein the query component is deployed in a container and operates to issue a query to retrieve a query result from a database, wherein the query is associated with a transaction, and wherein the query result includes one or more instances of a class that is managed by the container, wherein the class represents one or more persisted data entries retrieved from the database and the one or more persisted data entries are associated with at least one row in a table in the database;
a cache management component, running on the one or more microprocessors, to store the one or more instances of the class in a cache;
a query registration component, running on the one or more microprocessors, to perform the steps of:
maintaining the query in a query registry with one or more queries;
looking up the query in the query registry; and
allowing the cache management component to retrieve the stored one or more instances of the class for the query in the cache, when the query registration component determines that another query matches the query in the query registry; and
wherein the cache management component further operates to
allow the one or more instances of the class to be used concurrently by multiple users using an optimistic concurrency strategy, and wherein, under the optimistic concurrency strategy, the cache management component leaves the one or more instances of the class in the cached query result unlocked when the one or more instances of the class remain unchanged during the transaction;
invalidate the one or more instances of the class in the cached query result that are used concurrently by multiple users during the transaction, when a row in the table in the database that is not used by the cached query result is updated or invalidated; and
remove the query from the query registry and remove the cached query result with the one or more instances of the class from the cache.

2. The system according to claim 1, wherein:
the class is one of a software object, an interface, and a module.

3. The system according to claim 1, wherein:
a query language used by the query is SQL or a high level query language.

4. The system according to claim 1, wherein:
the query is configured to use a primary key of a data entity in the database.

5. The system according to claim 1, wherein:
the query registration component is configured to maintain the query registry by inserting or deleting a string of a query in the query registry.

6. The system according to claim 1, wherein:
the query registration component is configured to look up the query by performing an exact matching between a string of the query and a string of a query in the query registry.

7. The system according to claim 1, wherein:
the database is a relational database.

8. The system according to claim 1, wherein:
the cache management component is further configured to at least one of:
retrieve query result for a query in the cache by its key;
select a query and removing its result from the cache; and
invalidate the query result for a query in the cache.

9. The system according to claim 8, wherein:
the query is selected using a least-recently-used algorithm.

10. The system according to claim 8, wherein:
the query result for the query is invalidated when a part of the query result is invalid.

11. The system according to claim 1, wherein:
the query uses a non-primary key of a data entity in the database.

12. The system according to claim 1, wherein:
the query is removed from the query registry once the cached query result for the query is invalidated.

13. The system according to claim 1, wherein:
the cache management component supports dynamic query, wherein the cache management component caches one or more query results for consecutive queries that are executed with statements having different arguments while using a same query structure and settings, and wherein the cache management component retrieves a particular query result for a particular query in the consecutive queries based on a statement with a particular argument.

14. The system according to claim 1, wherein:
one or more instances of another class in the cached query result is invalidated when any part of the cached query result is invalidated, even when the one or more instances of the another class in the cached query result is frequently accessed but rarely updated.

15. A method to provide query caching, comprising:
deploying a query component in a container, running on the one or more microprocessors;
issuing, via a cache management component running on the one or more microprocessors, a query to retrieve a query result from a database, wherein the query is associated with a transaction, and wherein the query result includes one or more instances of a class that is managed by the container, wherein the class represents one or more persisted data entries retrieved from the database and the one or more persisted data entries are associated with at least one row in a table in the database;
storing, via the cache management component, the one or more instances of the class in a cache;
maintaining, via a query registration component running on the one or more microprocessors, the query in a query registry with one or more queries;
looking up, via the cache management component, the query in the query registry;
retrieving, via the cache management component, the stored one or more instances of the class for the query in the cache when another query matches the query in the query registry;
allowing the one or more instances of the class to be used concurrently by multiple users using an optimistic concurrency strategy, and wherein, under the optimistic concurrency strategy, the cache management component leaves the one or more instances of the class in the cached query result unlocked when the one or more instances of the class remain unchanged during the transaction;
invalidating the one or more instances of the class in the cached query result that are used concurrently by multiple users during the transaction, when a row in the table in the database that is not used by the cached query result is updated or invalidated; and
removing the query from the query registry and removing the cached query result with the one or more instances of the class from the cache.

16. The method according to claim 15, wherein:
a query language used by the query is SQL or a high level query language.

17. The method according to claim 15, wherein:
the query is configured to use a primary key of a data entity in the database.

18. The method according to claim 15, further comprising:
maintaining the query registry by inserting or deleting a string of a query in the query registry.

19. The method according to claim 15, further comprising:
performing an exact matching between the string of the query and the string of a query in the query registry.

20. The method according to claim 15, further comprising at least one of:
retrieving the query result for a query in the cache by its key;
selecting a query and removing its result from the cache; and
invalidating the query result for a query in the cache.

21. The method according to claim 20, wherein:
the query is selected using a least-recently-used algorithm.

22. The method according to claim 20, wherein:
the query result for the query is invalidated when a part of the query result is invalid.

23. A machine readable storage medium having instructions stored thereon that when executed cause a system to:
deploy a query component in a container;
issue a query, in a transaction, to retrieve a query result from a database, wherein the query result includes one or more instances of a class that is managed by the container, wherein the class represents one or more persisted data entries retrieved from the database and the one or more persisted data entries are associated with at least one row in a table in the database;
store the one or more instances of the class in a cache;
maintain the query in a query registry with one or more queries;
look up the query in the query registry;
retrieve the stored one or more instances of the class for the query in the cache when another query matches the query in the query registry;
allow the one or more instances of the class to be used concurrently by multiple users using an optimistic concurrency strategy, and wherein, under the optimistic concurrency strategy, the cache management component leaves the one or more instances of the class in the cached query result unlocked when the one or more instances of the class remain unchanged during the transaction;
invalidate the one or more instances of the class in the cached query result that are used concurrently by multiple users during the transaction, when a row in the table in the database that is not used by the cached query result is updated or invalidated; and
removing the query from the query registry and removing the cached query result with the one or more instances of the class from the cache.

24. The machine readable storage medium of claim 23, wherein:
a query language used by the query is SQL or a high level query language.

25. The machine readable storage medium of claim 23, wherein:
the query is configured to use a primary key of a data entity in the database.

26. The machine readable storage medium of claim 23, further comprising instructions that when executed cause the system to:
maintain the query registry by inserting or deleting a string of a query in the query registry.

27. The machine readable storage medium of claim 23, further comprising instructions that when executed cause the system to:
perform an exact matching between a string of the query and a string of a query in the query registry.

28. The machine readable storage medium of claim 23, further comprising instructions that when executed cause the system to perform at least one of:

retrieving the query result for a query in the cache by its key;

selecting a query and removing its result from the cache; and invalidating the query result for a query in the cache.

29. The machine readable storage medium of claim 28, further comprising instructions that when executed cause the system to:

select the query using a least-recently-used algorithm.

30. The machine readable storage medium of claim 28, further comprising instructions that when executed cause the system to:

invalidate the query result for the query when a part of the result is invalid.

31. A system to provide query caching, comprising:

a microprocessor;

means for deploying a query component in a container;

means for issuing a query to retrieve a query result from a database, wherein the query is associated with a transaction, and wherein the query result includes one or more instances of a class that is managed by the container, wherein the class represents one or more persisted data entries retrieved from the database and the one or more persisted data entries are associated with at least one row in a table in the database;

means for maintaining the query in a query registry with one or more queries;

means for looking up the query in the query registry;

means for storing the one or more instances of the class in a cache;

means for retrieving the stored one or more instances of the class for the query in the cache when another query matches the query in the query registry;

means for allowing the one or more instances of the class to be used concurrently by multiple users using an optimistic concurrency strategy, and wherein, under the optimistic concurrency strategy, the cache management component leaves the one or more instances of the class in the cached query result unlocked when the one or more instances of the class remain unchanged during the transaction;

means for invalidating the one or more instances of the class in the cached query result that are used concurrently by multiple users during the transaction, when a row in the table in the database that is not used by the cached query result is updated or invalidated; and means for removing the query from the query registry and removing the cached query result with the one or more instances of the class from the cache.

\* \* \* \* \*